United States Patent [19]

Glynn

[11] Patent Number: 5,343,732
[45] Date of Patent: Sep. 6, 1994

[54] APPARATUS FOR DETERMINING THE DEVIATION IN THE LEVEL OF LIQUID IN A VESSEL

[75] Inventor: James K. Glynn, 37 Grange Park Rise, Raheny, Dublin 5, Ireland

[73] Assignee: James Kevin Glynn, Dublin, Ireland

[21] Appl. No.: 745,080

[22] Filed: Aug. 15, 1991

[30] Foreign Application Priority Data

Aug. 15, 1990 [IE] Ireland ................... 546/90
Jun. 13, 1991 [IE] Ireland ................... 2006/91

[51] Int. Cl.5 ...................... G01F 19/00; G01F 25/00
[52] U.S. Cl. ........................................ 73/3; 73/1 H; 73/428
[58] Field of Search .............. 73/1 H, 3, 168, 426, 73/427, 428

[56] References Cited

U.S. PATENT DOCUMENTS

| | | | |
|---|---|---|---|
| 494,467 | 3/1893 | Donathen | 73/428 |
| 2,236,583 | 4/1941 | Selvig | 73/149 |
| 2,971,366 | 2/1961 | Tomkow | 73/3 |
| 3,058,353 | 10/1962 | Irwin | 73/428 |
| 3,521,366 | 7/1970 | Sampson et al. | 33/126.4 |
| 3,888,126 | 6/1975 | Cross | 73/426 |
| 4,033,190 | 7/1977 | Hudspeth | 73/426 |
| 4,062,228 | 12/1977 | Peak | 73/427 |
| 4,109,530 | 8/1978 | Kim | 73/427 |
| 4,531,293 | 7/1985 | Grinde | 73/428 |
| 4,928,514 | 5/1990 | Beaston | 73/3 |
| 5,125,466 | 6/1992 | Felt et al. | 73/428 |

FOREIGN PATENT DOCUMENTS 3431720 12/1985 Fed. Rep. of Germany ........ 73/426
1457457 12/1976 United Kingdom .

Primary Examiner—Hezron E. Williams
Assistant Examiner—George M. Dombroske
Attorney, Agent, or Firm—Jacobson, Price, Holman & Stern

[57] ABSTRACT

An apparatus (1) for determining the accuracy of a volume of liquid dispensed via a dispenser such as a petrol, liquid gas or diesel pump dispenser. The apparatus (1) comprises a vessel (2) having a narrowed neck portion (20) for reception of a measured volume of liquid from the dispenser. A hollow tubular member (5) can be inserted into the vessel (2) to displace the liquid upwardly. The tubular member (5) has in its side wall a liquid inlet hole 10. Upon insertion of the tubular member (5) in the vessel (2) upwardly displaced liquid can pass through the hole (10) into the tubular member (5). Liquid level within the tubular member (5) can be read against a scale tube (15) housed within the tubular member (5) upon withdrawal of the tubular member (5) to indicate the accuracy of the registered volume of fluid dispensed by the dispenser.

3 Claims, 4 Drawing Sheets

FIG. 5
FIG. 6
FIG. 7
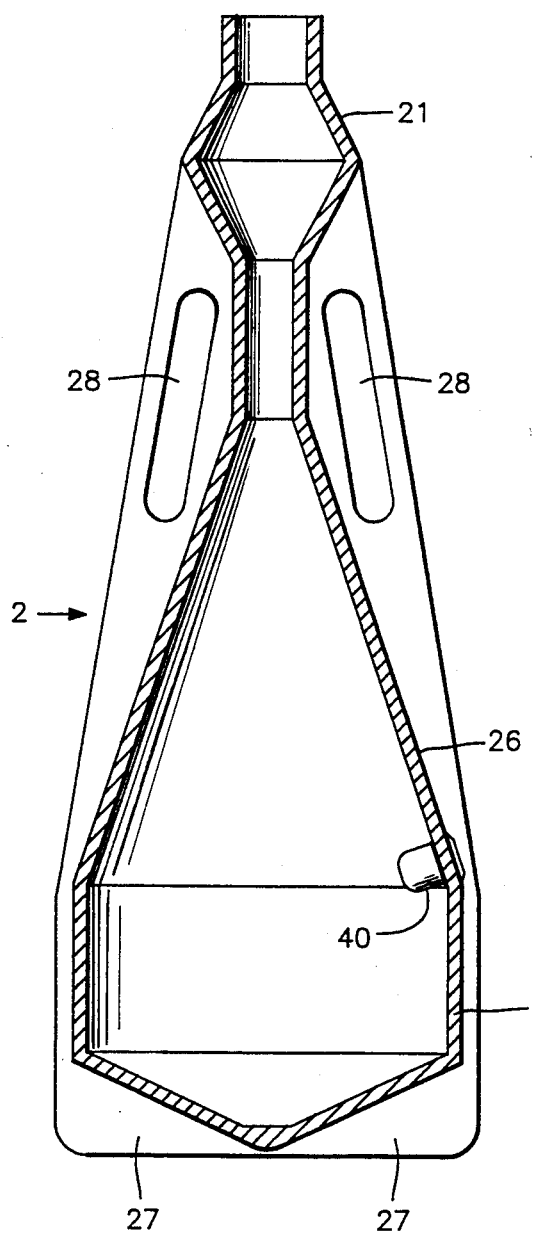
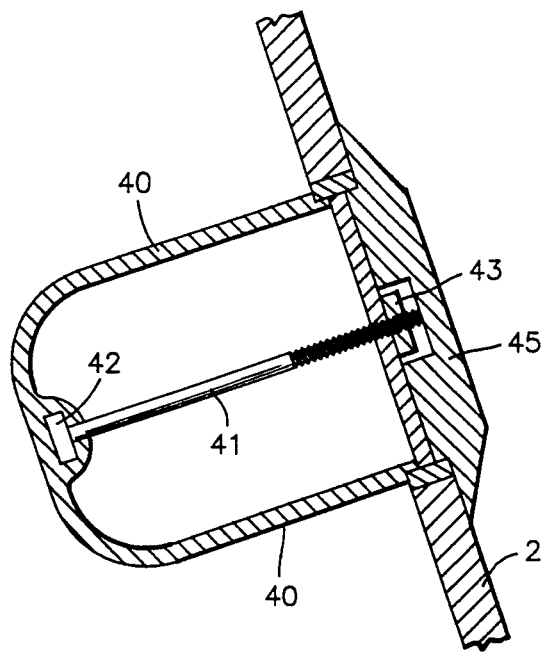
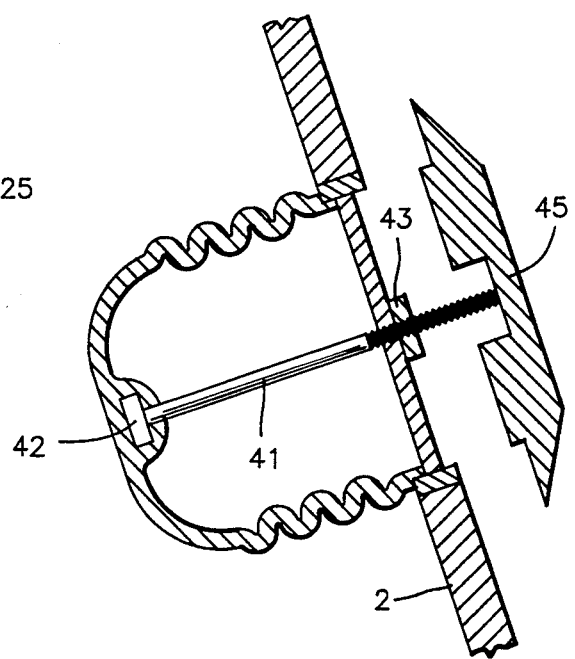

APPARATUS FOR DETERMINING THE DEVIATION IN THE LEVEL OF LIQUID IN A VESSEL

The invention relates to an apparatus for determining the deviation in the level of liquid in a vessel from a desired level corresponding to a preset level. More particularly the invention relates to an apparatus for determining the accuracy of a volume of liquid dispensed via a dispenser such as a petrol, liquid gas or diesel pump dispenser.

The object of the invention is to provide such an apparatus which is relatively simple in construction and operation but which has a high degree of accuracy in use.

According to the invention there is provided an apparatus for determining the deviation in the level of liquid in a vessel from a desired level corresponding to a preset volume, the apparatus comprising a displacement means which displaces the level of liquid in the vessel over a weir means, the displaced liquid being measured to determine the deviation in the volume of liquid in the vessel from the preset volume.

In a particularly preferred embodiment of the invention the displacement means comprises an elongate member which is inserted into the vessel to displace the level of liquid in the vessel upwardly over the weir means.

Preferably the displacement means comprises a hollow tubular member which is closed at the lower end thereof.

In a particularly preferred arrangement the tubular member has an inlet defining the weir means over which the displaced liquid flows on insertion of the tubular member.

In an especially preferred arrangement the inlet is located in the tubular member at a level corresponding to the desired level in the vessel.

Ideally, an indicating scale is provided in the tubular member.

Preferably the scale is provided by an elongate scale member extending through the tubular member, the scale member being graduated to indicate the deviation in the volume dispensed from a preset volume.

In one embodiment of the invention the apparatus includes a vessel for collecting dispensed liquid, the vessel having a narrowed neck portion in which the fluid is displaced by the displacement means. Preferably the vessel includes an enlarged filling portion above the neck portion. Most preferably the vessel includes a base portion and a conical portion between the base portion and the neck portion.

In a particularly preferred embodiment of the invention the vessel includes voluble adjustment means for calibrating the preset volume. Preferably, the adjustment means comprises a body member in the vessel, the body member being movable into and out of the vessel to calibrate the test volume. Ideally, the body is of flexible material.

In another embodiment of the invention the weir means comprises an outlet in the vessel adjacent to the level corresponding to the preset volume, displaced liquid passing through the outlet for measurement to determine the deviation in the volume of liquid in the vessel from the preset volume.

The invention will be more clearly understood from the following description thereof given by way of example only with reference to the accompanying drawings in which.

Figure 4A:
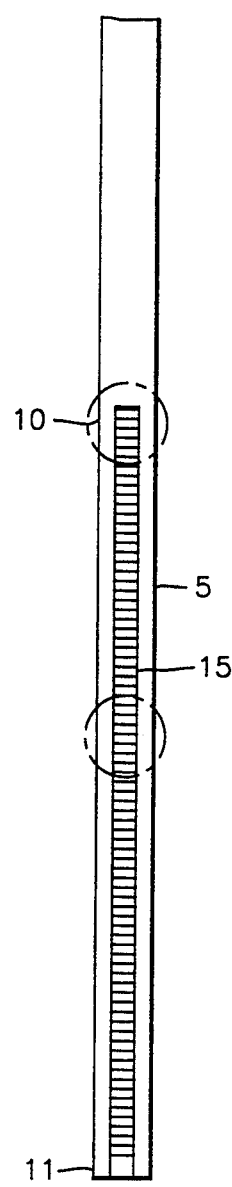
FIG. 4(a) is a side view of another part of the apparatus.
Figure 4B:
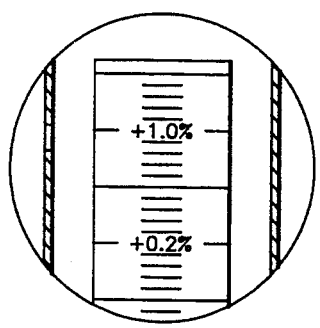
Figure 4C:
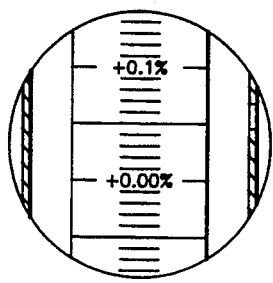
Figure 3:
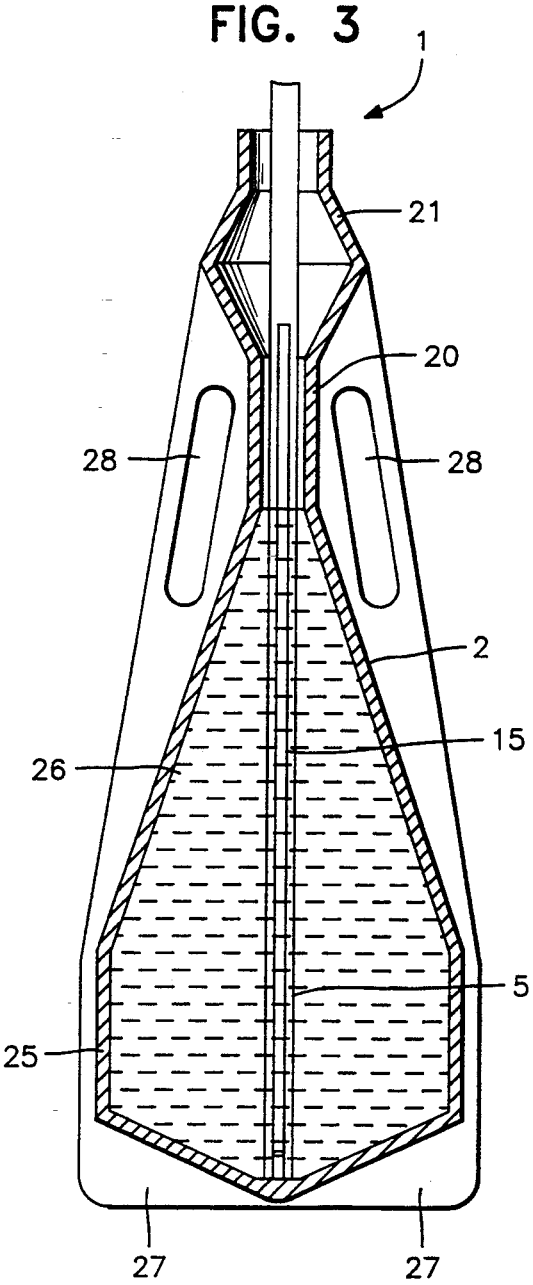
FIG. 3 is a cross-sectional view of the vessel with another part of the apparatus in place.

FIGS. 4(b) and 4(c) are enlarged cross-sectional views of parts of the apparatus of FIG. 4(a);

FIG. 5 is a cross-sectional view of a modified apparatus;

FIG. 6 and 7 are cross-sectional views of part of the apparatus of FIG. 5; and

Figure 8:
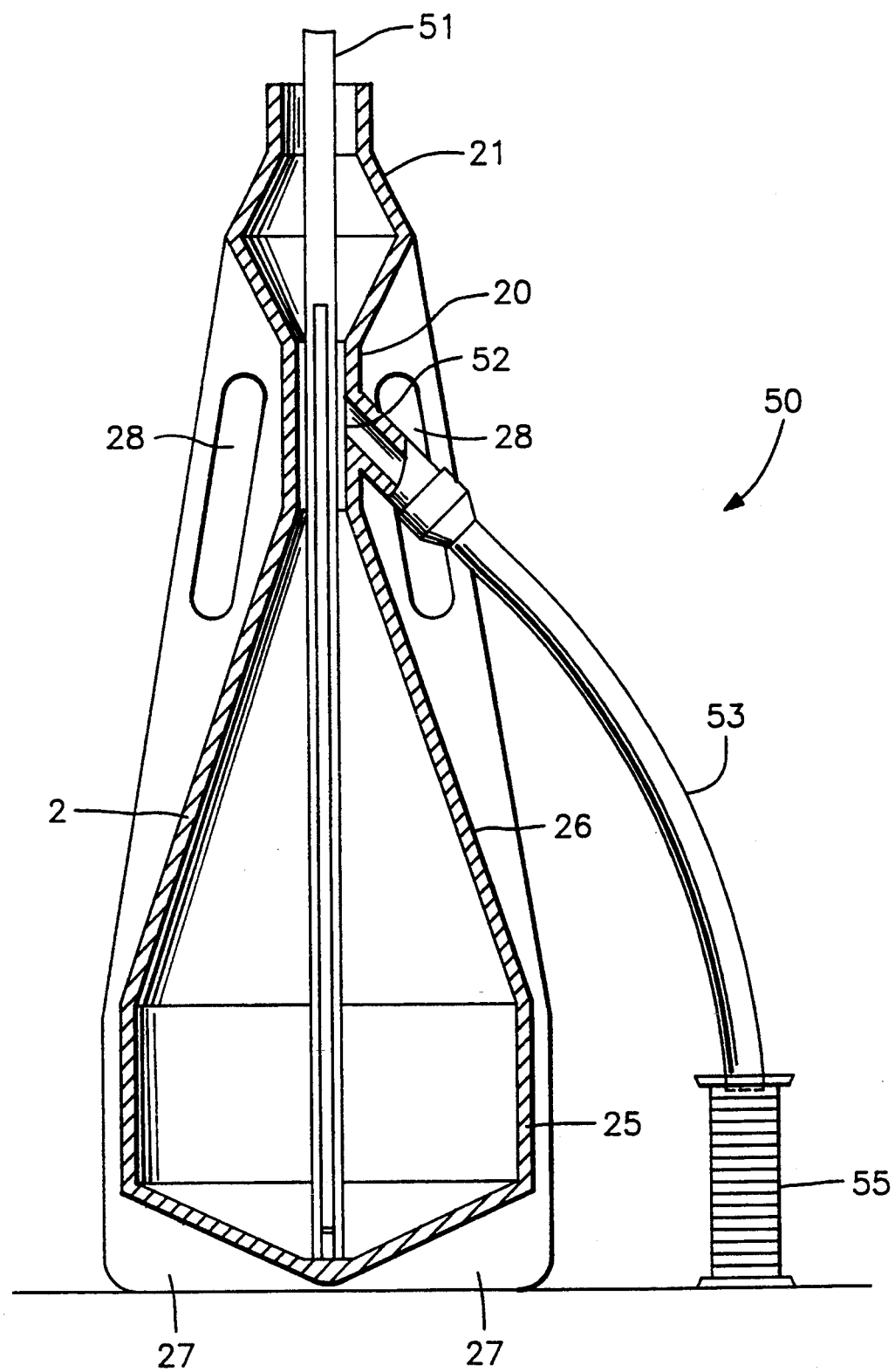

FIG. 8 is a cross-sectional view of an alternative construction of apparatus according to the invention;

Referring to the drawings and initially to FIGS. 1 to 4 thereof, there is illustrated an apparatus indicated generally by the reference numeral 1 for determining the deviation in the level of liquid in a vessel 2 from a desired level 3 corresponding to a preset volume. The apparatus is particularly for determining the accuracy of a volume of fluid dispensed by a dispenser such as a petrol, liquid petroleum gas or diesel pump dispenser. The apparatus 1 comprises a displacement means which in this case comprises an elongate member in the form of a hollow tubular member 5 which is inserted into the vessel 2 to displace the level of liquid in the vessel 2 upwardly. In this case, the tubular member 5 has an inlet hole 10 defining a weir means which in use is located approximately at a level corresponding to the desired level 3 in the vessel 2. The tubular member 5 is closed at a lower end 11 thereof so that on insertion of the tubular member 5 into the vessel 2 liquid is collected in the tube 5 and is retained therein as the tube 5 is withdrawn from the vessel.

An indicating scale is provided in the tubular member 5 by an inner closed tubular member 15 which is fixed in position relative the tube 5 and has marked thereon or provided therein scale lines indicating the deviation in the amount of fluid dispensed into the vessel 2 from the desired preset amount. The scale is marked to indicate the deviation from the desired amount either in direct volume terms such as milliliters or, as in the case illustrated, in percentage amounts to an accuracy of at least ±0.05%.

It will be appreciated that the inlet hole 10 may be of any desired shape and configuration such as V-shape. Alternatively, two or more holes or a slot or slots may be provided.

In more detail, the vessel 2 may be of any desired shape and configuration. Preferably, the vessel includes a narrowed neck portion 20 in which the liquid is displaced by the tubular member 5 and an enlarged filling portion 21 above the neck 20 to avoid splash loss and to simulate the filling of a petrol or diesel tank of a motor vehicle. The vessel 2 below the neck portion 20 includes a generally tubular base portion 25 and a conical portion 26 leading from the base portion 25 to the narrowed neck portion 20. The vessel 2 is provided with base support legs 27 and carrying handles 28. Preferably, the vessel is moulded from polyester resin-filled material to give substantially constant dimensions with the variations of temperature. The surface of the polyester material also has the surface tension which not only avoids air traps but also minimises adhesion on emptying of liquid from the vessel 2.

The inlet hole 10 is almost circular, with a small downwardly extending extension. The extension may be of any suitable shape, preferably of V-shape. Alternatively, two or more holes or a slot or slots may be provided.

The conical portion 26 of the vessel 2 ensures that air does not become trapped in the vessel 2. The narrowed neck portion 20 and the very small area defined between the tubular member 5 and the neck 10 on insertion of the tubular member 5 into the vessel 2 substantially eliminates errors that might arise due to the fact that the vessel 2 may not be supported on level ground.

Figure 1:
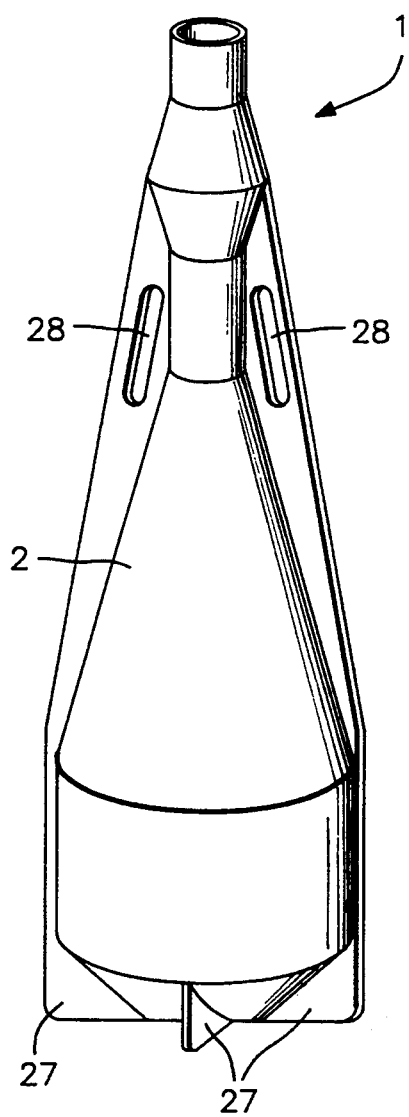
FIG. 1 is a perspective view of a vessel forming part of an apparatus according to the invention.
Figure 2:
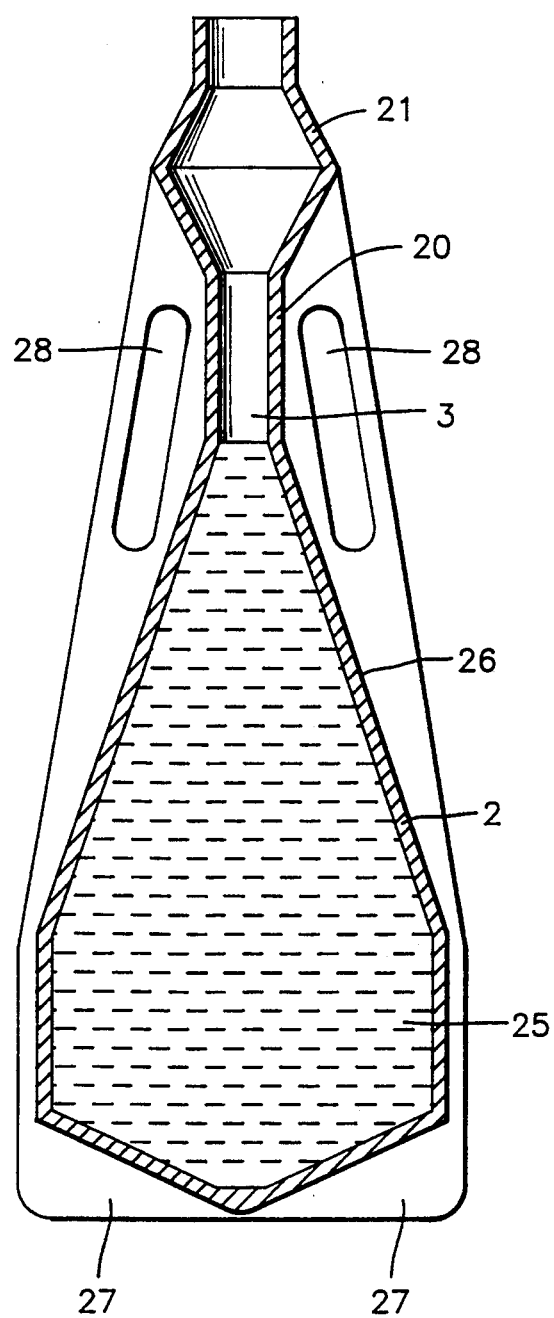
FIG. 2 is a partially cross-sectional view of the vessel of FIG. 1.

In use, to check the accuracy of a dispenser such as a petrol, liquid petroleum gas or diesel pump, an amount is dispensed into the vessel 2 until the dispenser reads a known amount such as, for example, 10 liters. The vessel 2 used in this case will have a nominal volume of 10 liters and on filling by the dispenser the level of fluid in the vessel 2 will reach approximately to the lower part of the neck portion 20 of the vessel 2 as illustrated in FIG. 2. The tubular member 5 is then inserted into the vessel 2 until the lower closed end 11 hits the bottom of the vessel 2. On insertion of the hollow tubular member into the vessel 2 the liquid is displaced upwardly in the vessel 2 through the neck the portion 20 and passes through the inlet hole 10 into the tubular member 5 in the space defined between the inner scale tube 15 and the tubular member 5. This action is diagrammatically illustrated in FIG. 3. When the liquid in the vessel 2 has settled, the tubular member 15 is withdrawn and the amount of liquid in the tube is read off on the scale tube 15 indicating the accuracy of the amount of fluid dispensed by the dispenser. A reading of 0.00% on the scale tube 15 indicates a 100% accuracy of the dispenser under test while a reading below 0.00% indicates below volume delivery by the amount indicated on the scale. Similarly, readings above 0.00% indicates excess delivery by the amount indicated. Readings above and below that on the scale indicate to the user how accurate the pump is dispensing both below or above volume and the amount by which the volume is above or below the desired level. The dispensing pump may then be adjusted accordingly and the process repeated to check the accuracy of dispensing. The data collected using the apparatus of the invention may also be used in the calculation of stock errors and to assist in making volumetric and financial calculations useful in business management function of forecourt sites and the like.

By firstly restricting the upper level of liquid in the vessel 2, by secondly providing a very narrow gap between the displacement tube and the neck of the vessel 2 and by further elongating the amount of liquid in the tube by passing it into a narrowed space between the scale tube and the tubular member 5 a very high level of accuracy is achieved. Further, the scale is both quick and easy to read. Because the scale can be read quickly and easily, losses due to evaporation of volatile products are minimised.

Referring now to FIGS. 5 to 7, there is illustrated an additional feature of an apparatus according to the invention in the form of volume adjustment means for calibrating the preset voluble of the vessel 2. In this case the adjustment means comprises a body 40, in this case of flexible material, mounted in the vessel 2, the body being movable into and out of the vessel 2 to calibrate the test volume. The flexible body 40 is of rubber or similar material and is moved into and out of the vessel 2 by means of a threaded bar 41 having a head 42 which is moulded into the flexible body 40. The threaded bar 41 is turned on a adjusting nut 43 to move the flexible body 40 inwardly and outwardly with respect to the vessel as required to raise or lower the liquid level in the vessel for calibration. When set, the adjustment mechanism is covered and sealed by a cap 45. In the calibration procedure exactly 10 liters of de-aerated water is poured into the vessel 2 and the hollow tubular member 15 is inserted. Depending on the reading on the scale of the tubular member, the body 40 is moved into or out of the vessel 2 until a 0.00% reading is achieved on the scale tube 15. When this is achieved the body 40 is fixed in position as already described.

It will be appreciated that the depth to which the tubular member 15 is inserted into the vessel 2 may be controlled manually or automatically, for example, taking account of temperature differences and/or the type of liquid being measured.

Referring now to FIG. 8 there is illustrated an apparatus according to another embodiment of the invention which is indicated generally by the reference numeral 50. The vessel 2 of the apparatus is similar to the vessel described above with reference to FIGS. 1 to 7 and like parts are assigned the same reference numerals. In this case the displacement means comprises an elongate member 51 and the vessel includes an overflow outlet 52 in the neck portion 20 thereof which defines a weir means for which liquid displaced on insertion of the member 51 is discharged through a tube 53 into a measuring phial such as a graduated cylinder 55. The apparatus 50 is operated in a similar manner to the apparatus described above with reference to FIGS. 1 to 7 except that in this case the accuracy of the dispenser is determined by the amount of liquid which is delivered into the graduated cylinder 55 on insertion of the elongate rod 51. It will be appreciated that the measuring phial may be separate from, attached to or integral with the vessel 2.

It is also anticipated that the displacement means of the invention may be used in association with vessels other than the types of vessels described. It is anticipated, for example, that the apparatus comprising the displacement means in the form of a tubular member 5 only may be used, in association with another vessel such as a volumetric flask, cylinder (graduated or otherwise), pressurised gas container, or where a known weight of liquid is dispensed into a vessel, and the volumetric deviation therefrom, is used as an accurate measure of specific gravity, or temperature.

Many variations on the specific embodiments of the invention described will be readily apparent and accordingly the invention is not limited to the embodiments hereinbefore described which may be varied in both construction and detail.

I claim:

1. Apparatus for determining the deviation in the level of liquid in a vessel from a desired level corresponding to a preset volume, the apparatus comprising a vessel for collecting liquid, the vessel having a narrowed neck portion with a neck cross-sectional area, a displacement means insertable into the narrowed neck portion of the vessel to temporarily reduce the neck cross-sectional area and displace a portion of the liquid in the vessel over a weir means, and measuring means for receiving the liquid displaced over the weir means to determine the deviation in the volume of liquid in the vessel from a preset volume;

wherein the displacement means comprises:

an elongate member which is inserted into the vessel to displace the level of liquid in the vessel upwardly over the weir means; and a hollow tubular member which is closed at the lower end thereof, said tubular member having an inlet defining the weir means over which the displaced liquid flows on insertion of the tubular member.

2. Apparatus as claimed in claim 1 wherein the inlet is located in the tubular member at a level corresponding to the desired level in the vessel.

3. Apparatus for determining the deviation in the level of liquid in a vessel from a desired level corresponding to a preset volume, the apparatus comprising a hollow tubular displacement member which is closed at the lower end thereof, the tubular member having an inlet defining a weir means which opens into the hollow displacement member so that displaced liquid flows into the interior of said displacement member to be measured to determine the deviation in the volume of liquid in the vessel from a preset volume.

* * * * *